(12) United States Patent
Gardner et al.

(10) Patent No.: US 8,291,639 B2
(45) Date of Patent: Oct. 23, 2012

(54) GROWING SYSTEM FOR HYDROPONICS AND/OR AEROPONICS

(75) Inventors: Guy Gardner, Sparks, NV (US); Darin Allison, Reno, NV (US)

(73) Assignee: S and E Properties, Inc., Sparks, NV (US)

( * ) Notice: Subject to any disclaimer, the term of this patent is extended or adjusted under 35 U.S.C. 154(b) by 0 days.

(21) Appl. No.: 12/876,006

(22) Filed: Sep. 3, 2010

(65) Prior Publication Data

US 2011/0056132 A1  Mar. 10, 2011

Related U.S. Application Data

(60) Provisional application No. 61/240,803, filed on Sep. 9, 2009, provisional application No. 61/295,982, filed on Jan. 18, 2010.

(51) Int. Cl.
 *A01G 31/00* (2006.01)
(52) U.S. Cl. .......................................................... 47/60
(58) Field of Classification Search ............ 47/60, 59 R, 47/62 R, 62 A
See application file for complete search history.

(56) References Cited

U.S. PATENT DOCUMENTS

| | | | | |
|---|---|---|---|---|
| 6,230,437 | B1* | 5/2001 | Wolverton et al. | 47/39 |
| 6,725,598 | B2* | 4/2004 | Yoneda et al. | 47/60 |
| 7,143,544 | B2* | 12/2006 | Roy | 47/60 |
| 7,426,802 | B2* | 9/2008 | Umbaugh, Jr. | 47/62 R |
| 7,587,859 | B2* | 9/2009 | Bradley | 47/62 R |
| 2005/0155286 | A1* | 7/2005 | Soukup | 47/60 |
| 2009/0126269 | A1* | 5/2009 | Wilson et al. | 47/62 R |
| 2009/0151248 | A1* | 6/2009 | Bissonnette et al. | 47/59 S |

* cited by examiner

*Primary Examiner* — Kristen C Hayes
(74) *Attorney, Agent, or Firm* — Ian F. Burns & Associates, P.C.

(57) ABSTRACT

A growing unit includes a tub onto which may be received a lid that receives a plurality of plant cuttings. The plant cuttings are received such that the roots extend into a cavity defined by the tub. A pump unit and production manifold distributes nutrient solution as a mist into the tub cavity, thereby feeding the plant cuttings. The tub unit has an external fan module that forces air into the tub cavity. A recess in the outer surface of the tub extends underneath the tub. The recess directs air from the fan module to the base of the tub where a well receives the pump. Air circulating around the well removes heat produced by the pump from the growing unit and helps maintain a desired temperature within the unit.

12 Claims, 11 Drawing Sheets

GROWING SYSTEM FOR HYDROPONICS AND/OR AEROPONICS

CROSS REFERENCE TO RELATED APPLICATIONS

This application claims priority to U.S. provisional patent application Ser. No. 61/240,803, filed Sep. 9, 2009 and 61/295,982, filed on Jan. 18, 2010, the contents of which are incorporated by reference herein.

FIELD OF THE INVENTION

The present invention relates to horticultural systems and methods and in particular to devices for cultivating plants using soil-less techniques such as hydroponics and/or aeroponics.

BACKGROUND

Hydroponics is a well known technique for cultivating plants. An advantage of hydroponics over conventional soil-based techniques is that the growing environment can be greatly controlled, in particular the nutrient level provided to the root environment. A further advantage is that water provided to the plants can be readily retained in the system providing significant water savings. More recently, a technique termed Aeroponics has been developed in which the plant roots, instead of being suspended in a nutrient solution, are suspended in a fine mist of a nutrient solution. Aeroponics has advantage over hydroponics because a greater range of plants can be cultivated aeroponically Many devices have been developed for cultivating plants using hydroponic and aeroponic techniques. These devices typically comprise a contained environment in which cuttings are suspended from a rack so that the roots are subjected to the nutrient solution or mist environment. A pump may be providing in the growing unit for circulating the nutrient solution, e.g. using an ebb and flow technique.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to cultivate plants aeroponically;
provide a growing unit capable of accommodating a large number of plants for its size;
provide a strong and sturdy growing unit;
provide a controlled atmosphere within the growing unit;
provide a controlled temperature within the growing unit;
provide a means for dissipating heat from the growing unit;
provide a means for cooling a pumping system of the growing unit; and
provide a tub arrangement for an ebb and flow hydroponics technique.

These and other advantages may be realized by reference to the remaining portions of the specification, claims, and abstract.

BRIEF DESCRIPTION OF ONE EMBODIMENT OF THE PRESENT INVENTION

In one broad embodiment, the invention may comprise a growing unit comprising a tub and one or more plant retaining devices receivable in the tub. At least one formation may be provided on the tub for directing air from a fan unit mounted on the tub to underneath the tub.

In one broad embodiment, the invention may comprise a method for cooling a growing unit. The growing unit may comprise a tub having a recess in the base of the tub and the tub may be cooled by directing air from a fan unit mounted on the tub into the recess.

In one broad embodiment, the invention may comprise a tub for a growing unit. The tub may include at least one peripheral channel formed at a peripheral edge of the tub and a plurality of channels that drain towards the peripheral channel. A drain disposed at a peripheral edge of the tub may provide a low point to which the peripheral channel drains.

In one broad embodiment, the invention may comprise a hydroponic method in which a tub containing one or more plants is provided with a nutrient solution to irrigate the plants. The nutrient solution may then be drained from the aperture via a plurality of channels in the base of the tub that drain to the aperture.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
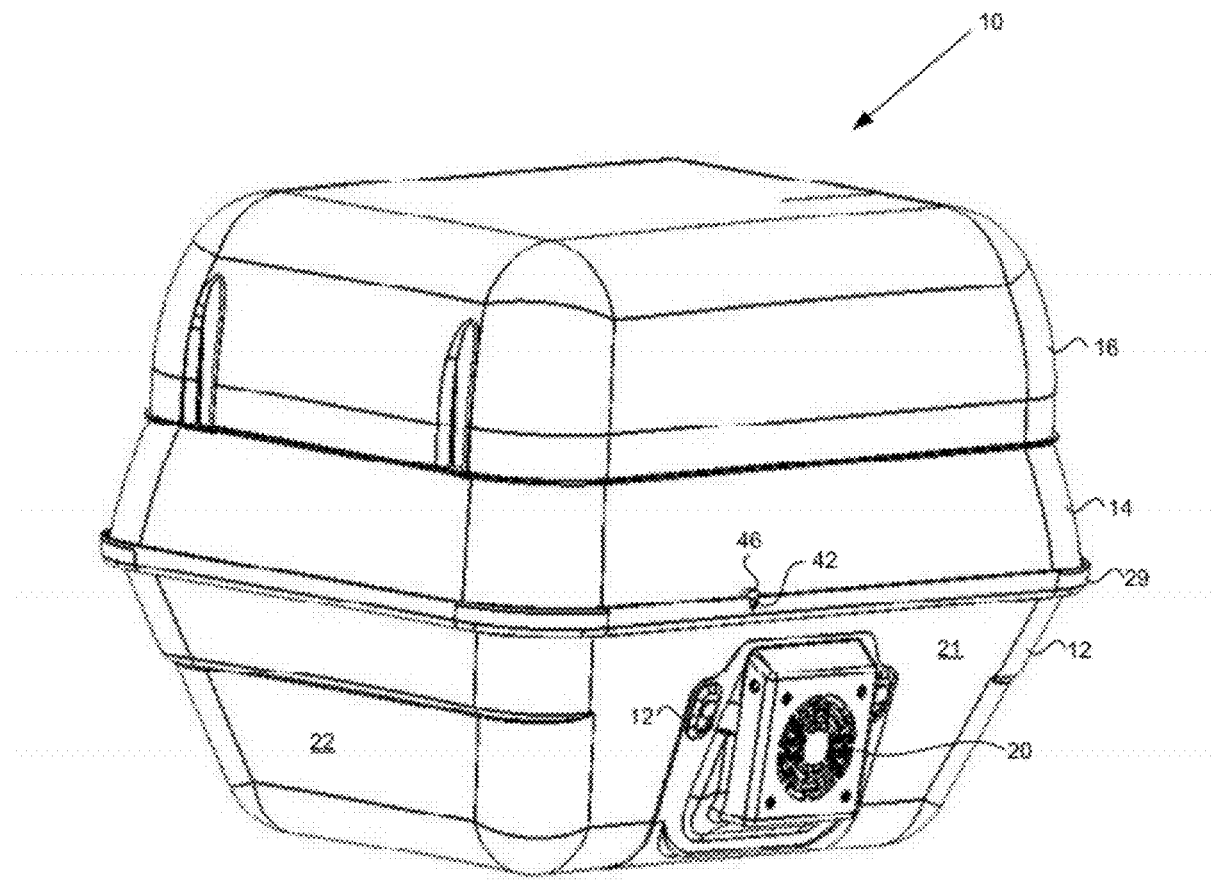
FIG. 1 is substantially a perspective view of one embodiment of a growing unit of the present invention.
Figure 2:
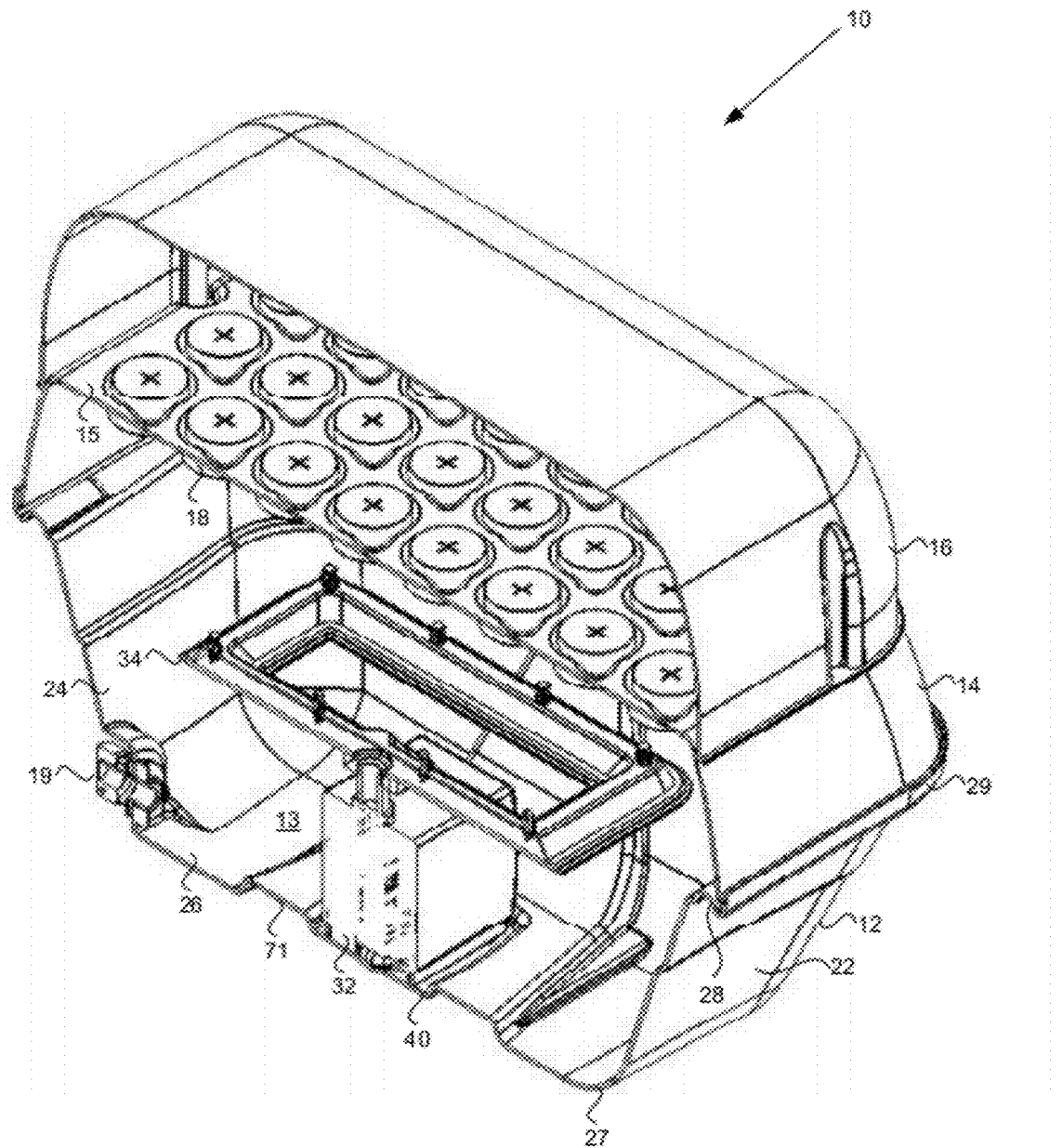
FIG. 2 is substantially a perspective cross sectional view of the growing unit of FIG. 1.

In FIG. 1, there is shown a perspective view of a growing unit 10. The growing unit includes a tub 12, a lid 14 and a humidity cover 16. Also shown is a fan unit 20. A perspective cross section of the growing unit 10 is shown in FIG. 2 to display the internal components of the growing unit 10. The tub 12 as shown in the figures is substantially rectangular and includes two long side walls 21 and 23 and two shorter side walls 22, 24 (side wall 24 not shown in FIG. 2). The side walls 21, 22, 23, 24 and the base 26 together define a receptacle 13 that provides a root environment for the plants. The receptacle 13 receives and retains a nutrient solution. A drain valve 19 provided in side wall 24 allows the growing unit 10 to be drained when required.

An outer flange 29 and ledge 28 is formed at the upper edge of the tub side walls. The lid 14 is sized to be rest on the ledge 28 within the outer flange 29, thereby retaining the lid 14 on the tub 12. Other methods for retaining the lid 14 on the tub 12 will be apparent to a person skilled in the art. The upper surface 15 of the lid 14 is configured to receive a plurality of collars 18. In one embodiment, the collars are received in apertures formed in the upper surface 15 of the lid 14. The collars may be of a resilient material such as a foam made out of suitable material, such as Ethylene vinyl acetate, that expands to fill the aperture, thereby securely retaining the collar in the aperture. The collars 18 support plant cuttings so that the roots of the plant cuttings are suspended in the receptacle 13. In an alternative embodiment (not shown), the upper surface 15 of the lid 14 may be replaced with a removable rack or the like that may be configured to support the plant cuttings. Other configurations for providing the plant supports will be apparent to a person skilled in the art and are considered to be within the scope of the present invention.

The side walls of the lid 14 curve inwards towards the upper surface 15. The humidity cover 16 is generally rectangular and sized so that the humidity cover 16 sits comfortably on top of the lid 14, thereby requiring no physical retention system to retain the humidity cover 16 on the lid 14.

A more positive retention of the humidity cover may be provided by some form of complementary engagement means, such as flanges, latches, etc, which may be formed on the entire edges of the side walls or along selected parts of the edges of the side walls. Alternatively, the humidity cover may be hinged to lid 14.

While the growing unit is shown as generally rectangular, other shapes are considered to be within the spirit and scope of the invention. For example, the growing unit may be generally square, circular, hexagonal, octagonal, etc.

A circulation system for circulating the nutrient solution includes a pump 32 which collects the nutrient solution from the receptacle 13 and disperses the nutrient solution through a dispersion system 34 which will described in more detail below.

Figure 3:
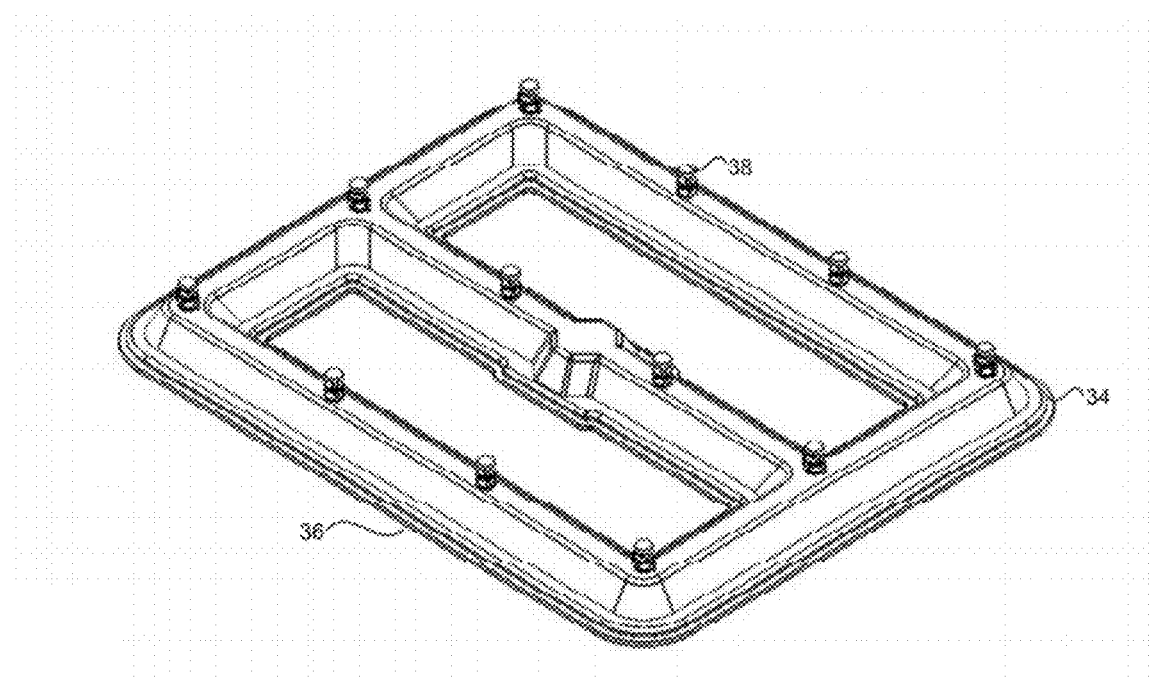
FIG. 3 is substantially a perspective view of a production manifold.
Figure 4:
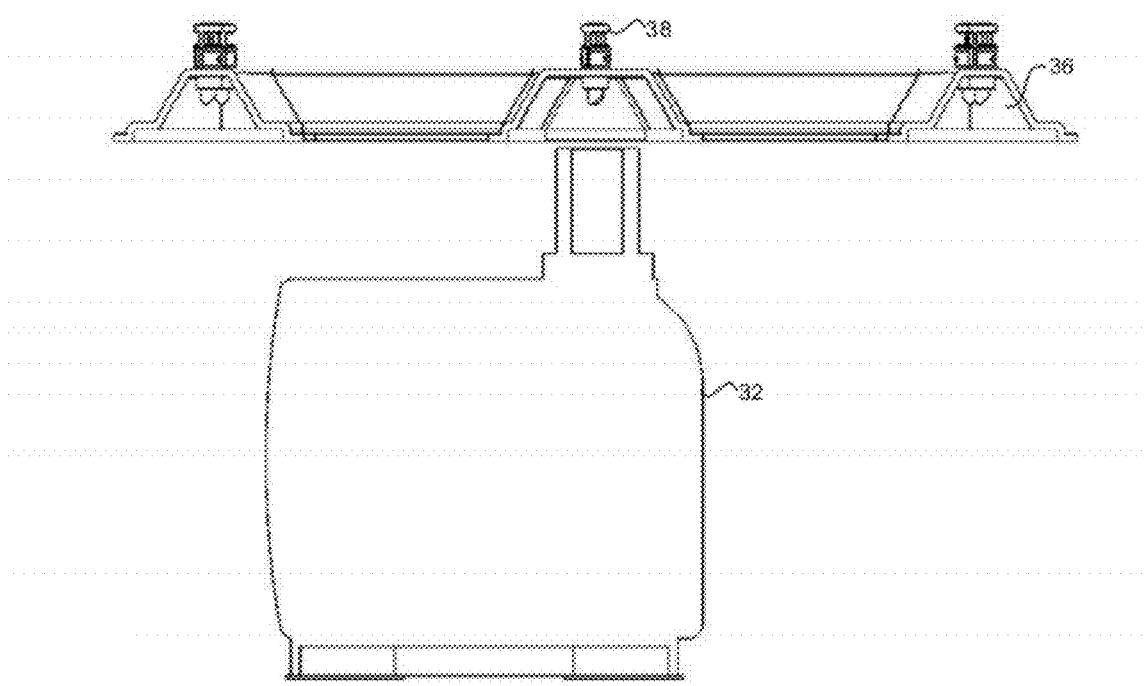
FIG. 4 is substantially a side cross sectional view of the production manifold and a pump.

An embodiment of the circulation system will now be described in more detail with reference to FIGS. 3 and 4. FIG. 3 shows a production manifold 34 in perspective while FIG. 4 shows the production manifold 34 and pump 32 in cross section. The production manifold 34 includes a plurality of hollow channels 36. The pump 32 collects nutrient solution from the base of the tub and pumps the nutrient solution into the channels 36 under pressure. Spray jets 38 extend into the channels 36. The pump pressurizes the nutrient solution in the channels 36 so that the nutrient solution is dispersed as a mist throughout the receptacle 13. The tub 12 is formed with a well 40 (FIG. 2) in the base 26 that receives the pump 32 and provides a local low point of the receptacle 13, ensuring that the nutrient solution naturally drains to this well 40 to prevent the pump 32 from pumping dry. A power cord (not shown) provides power to the pump 32 from an external power supply, such as a battery or mains power. The power cord protrudes into the tub 12 via an aperture which may be formed as a first partial aperture 42 in the tub 12 (shown more clearly in FIG. 6) and a second partial aperture 44 in the lid 14 (shown in FIG. 10). The aperture may be sealed by a toroidal gasket 46. The production manifold 34 is shown as generally rectangular in keeping with the rectangular shape of the growing unit 10. However, other shapes of the production manifold are possible, in particular where other shapes are used for the growing unit. For example, the production manifold may be square, circular or be formed in a helical arrangement. Other configurations for the production manifold will be apparent to a person skilled in the art and all such shapes are intended to be encompassed herein.

Figure 5:
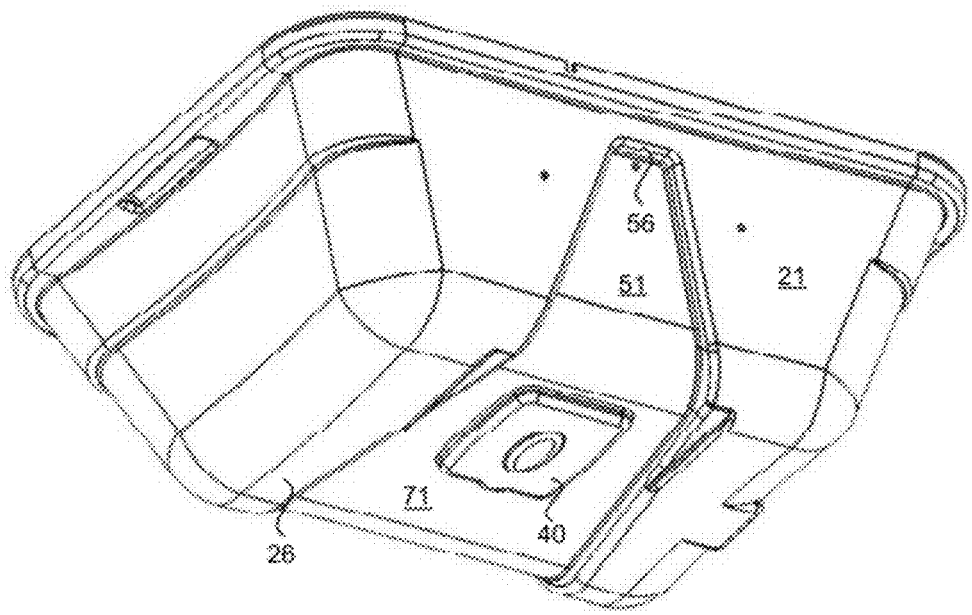
FIG. 5 is substantially an bottom perspective view of a tub of the growing unit.
Figure 6:
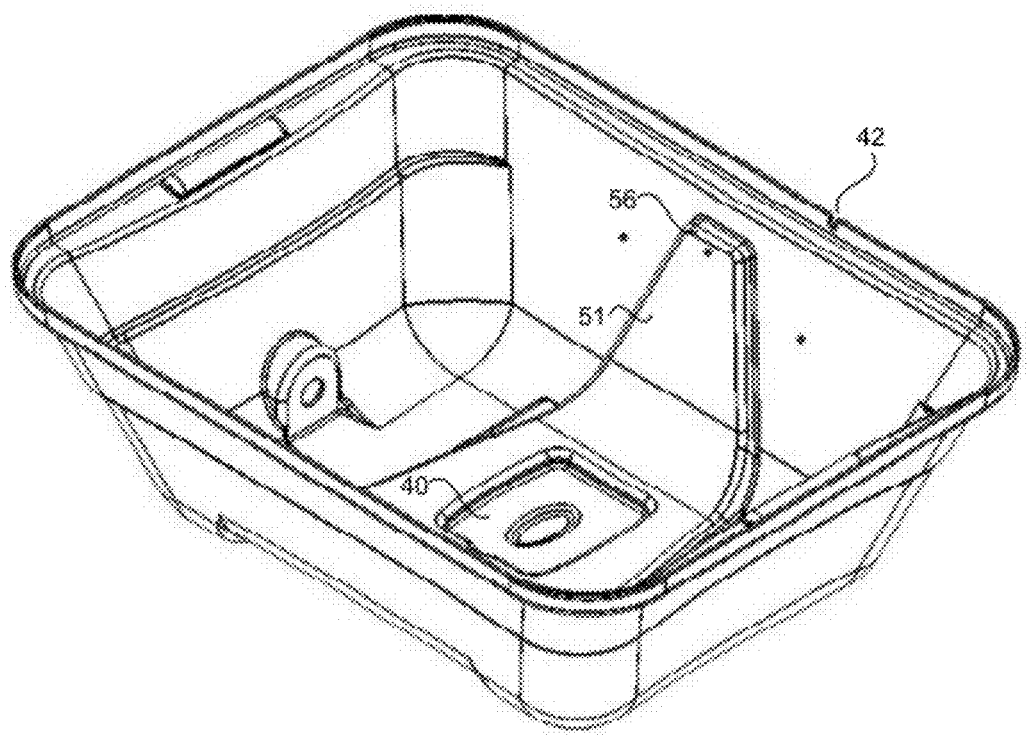
FIG. 6 is substantially an internal perspective view of the growing unit of FIG. 5.
Figure 7:
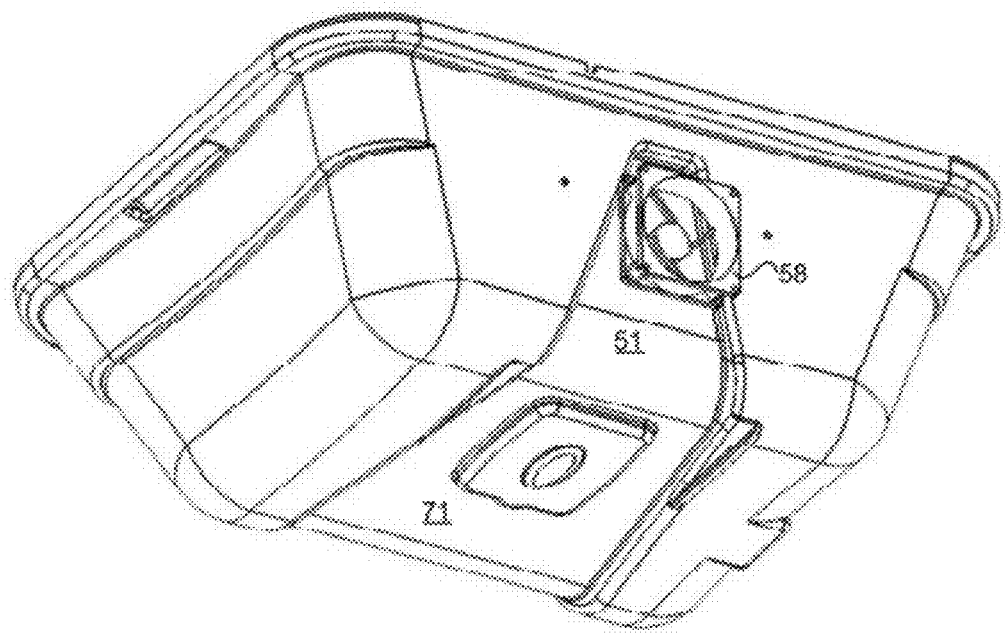
FIG. 7 is substantially an bottom perspective view of the tub of FIG. 5 showing a fan.

As described above, the growing unit 10 may include a fan unit 20. The fan unit 20 may be used to drive air into the growing unit 10. The fan unit 20 will be described in more detail with reference to FIGS. 5 to 9. FIG. 5 shows the tub 12 in perspective view seen from underneath. FIG. 6 shows an internal perspective of the tub 12. To accommodate the fan unit 20, the tub 12 is formed with recess 51 on one side wall 21 which extends inward to the tub 12. The recess 51 defines an air inlet 56 at the top of the recess 51. As shown in FIG. 7, the fan 58 may be located in the recess 51 by any suitable mounting (not shown) and then covered by a fan shroud 60 (FIG. 8) which is affixed to the outer surface of the side wall 52 by mountings 62. In operation, the fan 58 sucks air through the fan shroud 60 and directs the air into the receptacle 13 via air inlet 56. Other air vents may be provided in the growing unit 10 for increasing circulation through the unit.

Figure 9:
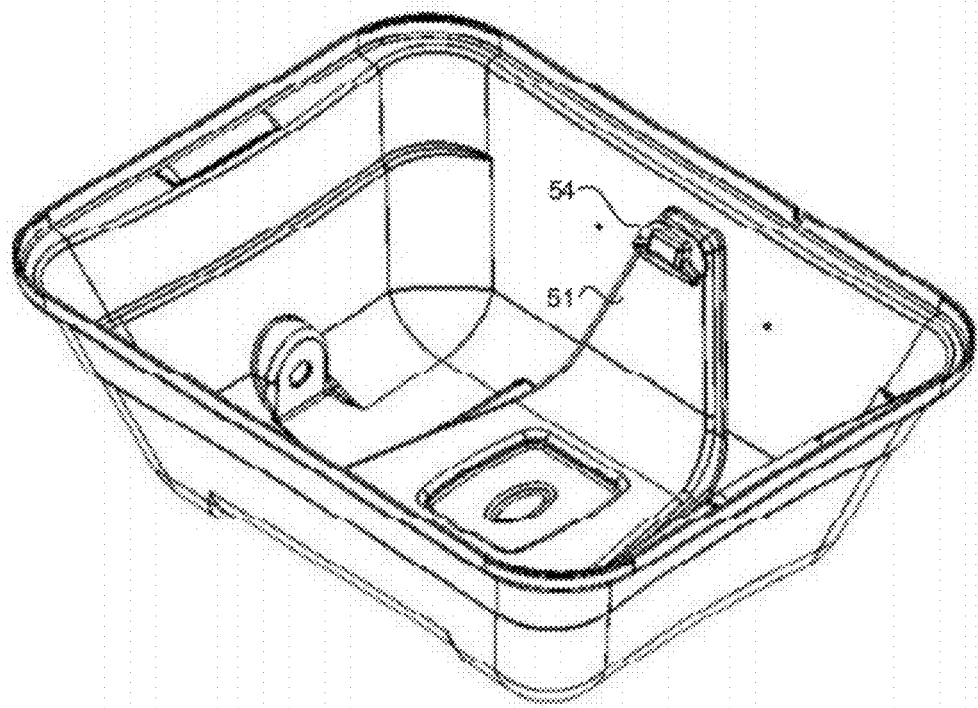
FIG. 9 is substantially an internal perspective view of the growing unit of FIG. 5 showing an internal baffle.
Figure 10:
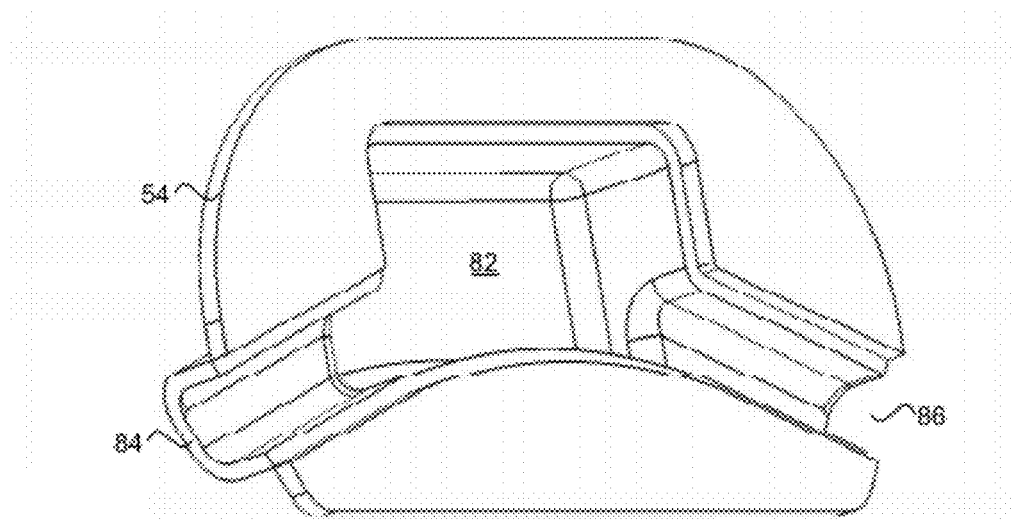
FIG. 10 is substantially an outside perspective view of the baffle.

To prevent the nutrient solution from spraying out of the chamber, an internal baffle 54 is mounted on the inside of the tub 12 to cover the air inlet 56 (FIG. 9). The baffle 54 is shown in FIG. 10 in perspective view as seen from the outside of the growing unit. The baffle 54 includes a main recess 82 that covers the air inlet 56 of recess 51. The main recess 82 conveys air to directing channels 84, 86 that direct air into the receptacle while allowing minimal nutrient mist to circulate into the fan area.

The fan unit 20 may be battery operated or may be connected to mains power. The fan unit 20 may also be operated on a timer that sets the fan to operate for various periods throughout the day. Other control systems (not shown) may be provided that set the times at which the fan operates, e.g. based on temperature and/or humidity of the growing unit or surrounding environment.

Figure 8:
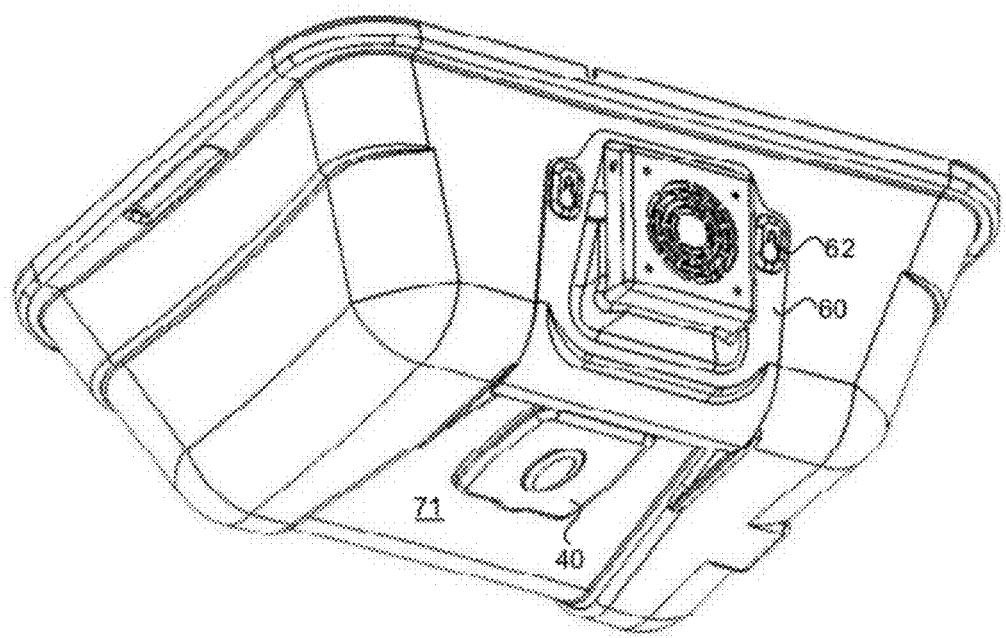
FIG. 8 is substantially an bottom perspective view of the tub of FIG. 7 showing a fan shroud.
Figure 11:
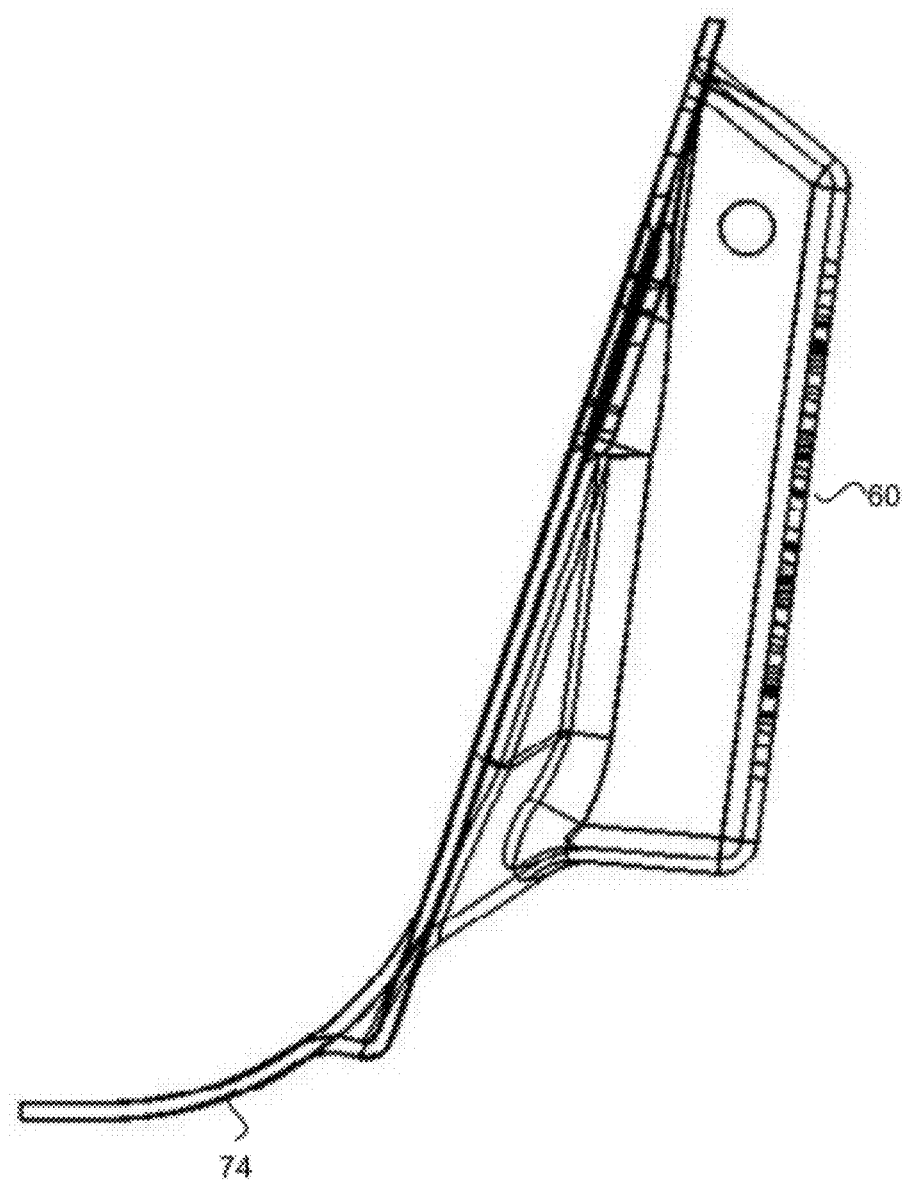
FIG. 11 is substantially a side view of the fan shroud.

One issue with prior art growing units is that the heat of the pump can cause the root environment to become too warm. Thus, in various embodiments, as shown in FIGS. 5, 7 and 8, the recess 51 can be formed to extend underneath the tub unit 12 forming a wide channel 71. The well 40 formed to receive the pump 32 may be formed as a protrusion within the channel 71, as seen from the exterior of the tub base 26. The channel 71 has the effect of channeling air from the fan towards the well 71, thereby cooling the exterior surfaces of the base 26 and removing heat conveyed to the base 26 by the pump 32. The fan shroud 60 shown in FIG. 8 and in side view in FIG. 11 may be configured with an extension 74 that matches the curve of the side wall 21 to the base 26. The fan shroud 60 thus assists the direction of air from the fan 58 into the channel 71.

A particular advantage of the fan unit presently described is that by circulating air under the unit, heat from the pump may be dissipated allowing the temperature of the root environment to be more accurately regulated. In various embodiments, the fan may be connected to control systems (not shown) that control the operation of the fan for temperature regulation purposes. The control systems may receive feedback from temperature sensors (not shown) used in conjunction with the growing unit so that the fan operates whenever the root temperature becomes excessive. In alternative embodiments, the fan may be electronically switched to the pump so that the fan operates at all times that the pump is operating.

Figure 12:
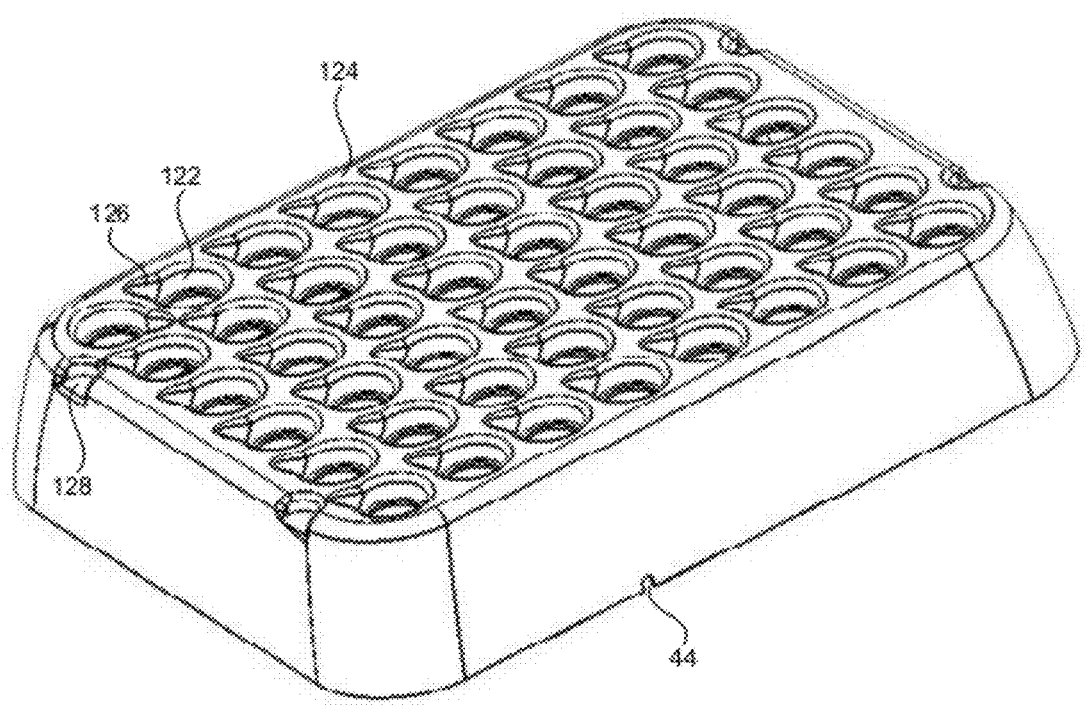
FIG. 12 is substantially a top perspective view of a lid of the growing unit of FIG. 1.

Further details of the lid 14 will now be described with reference to FIG. 12. The lid 14 may be formed in a variety of shapes. In the embodiment depicted in FIG. 12, the lid 14 is generally rectangular in cross section. The apertures 122 formed in the upper surface 124 of the lid are sized to receive resilient collars which hold the cuttings. Each aperture 122 may be formed with a recess 126 that allows a finger or a removal tool to be inserted outside of the collar, thereby allowing the collar to be easily removed from the lid 14. Indentions 128 may also be formed in the lid for providing finger grips or handles. As described above, the lid 14 may also incorporate a slot 44 forming half an aperture that receives a pump power cord.

In operation, cuttings are taking from a plant with desired characteristics. The cuttings are inserted into the collars 18 which are retained in the lid 14. The ends of the cuttings are sprayed with a rooting compound that causes the cuttings to sprout roots. The pump 32 is located in the well 40 and electrically connected by a power cord provided in the half apertures 42, 44. The tub 12 is at least partially filled with a nutrient solution, which may be provided before the lid 14 is placed on the tub 12 or afterwards through the drain valve 19. The lid 14 is placed on the tub 12, ensuring the gasket 46 seals the power cord. Placing the lid locates the sprayed ends of the cuttings into the receptacle 13. The humidity cover 16 may also be placed over the lid 14. When the pump 32 is operated, nutrient solution is collected by the pump 32 from the well 40 and circulated into the production manifold 34. The nutrient solution is sprayed as a mist from the jets 38 into the receptacle 13, thereby hydrating and feeding the developing root systems of the cuttings. The nutrient solution may re-condense and fall to the base 26 of the receptacle where it can be re-pumped by the pump 32.

In the embodiment shown, the cuttings are supported vertically. However, this need not be the case and other shapes are contemplated by the present invention. In one embodiment, the lid may have a generally arch-shaped cross section (i.e., is a partial cylindrical shape), which, for a given base size, increases the surface that can receive collars. In one embodiment, the lid may have a dome or hemispherical shape. In another embodiment, the lid may have a pyramid shape with the collars being received in each face of the pyramid with the plant stem growing outward of the pyramid and with the roots growing inward of the pyramid. In each of these various embodiments, the collar apertures may be provided in a stepped fashion so that the plants are retained vertically in the lid or the collars may be mounted so that the plants are retained normal to the surface of the lid.

Bacteria and algae build up can be a problem in hydroponics. In the prior art, the units must be periodically emptied and scrubbed to reduce build up. In order to reduce cleaning time, the growing unit is formed with few if any sharp corners which makes the unit easier to clean. In one embodiment, all radii, such as the corners 27 of the tub 12 (FIG. 2) are greater than ¼ inch. It should be noted that the corners include the edge corners (i.e. where two walls meet) as well as the corners where three walls meet. All such corners may be provided with a radius greater than ¼ inch. The growing unit 10 may also use a silane coating on any internal surfaces likely to be subject to bacteria or algae growth in order to inhibit such growth. In various embodiments, the silane coating may be an organosilane, such as octadecylaminodimethyltrimethoxysilylpropyl ammonium chloride, octadecylaminodimethyl-trihydroxysilylpropyl ammonium chloride, chloropropyltrimethoxysilane, and related silyl derivatives suitable for forming polymeric silicon-based coatings. Further details of the silane coating, including processes for coating the surfaces of the growing unit are described in the Applicant's co-pending provisional patent application Ser. No. 61/240,803, the entire contents of which are incorporated herein by reference.

A typical method for treating the relevant surfaces of the growing unit 10 may include heating the growing unit 10 (or disassembled parts of the growing unit 10) to approximately 100 to 230 degrees F. and spraying a solution of the organosilane compound onto the unit or part to be treated. Typically the treated surface is maintained at the designated temperature (100-230 degrees F.) for approximately one to two hours. Once the surface coating has dried and cured as described above, the hydroponic device may be put into service and the silane-derived coating will provide a microorganism resistant apparatus.

The growing unit 10 may be fabricated from plastic polymer materials, one example being ABS (acrylonitrile butadiene styrene) type plastics; other plastic base materials known to those in the art are also suitable for use in the growing unit 10.

Solutions of silane derivatives suitable for use in the present invention are typically used at levels of about 0.1 to about 5 percent by weight of silane derivative in water-based solutions. Concentrates of the silane derivative in alcohols (such as methanol) may be diluted in water to provide the spray solutions to be applied to a plastic substrate. Typical ratios of organosilane derivative to be applied to a plastic substrate are about 40 to 75 milligrams (mg) organosilane derivative per square foot (sq ft) of plastic substrate, usually from 50 to 64 mg/sq ft.

The tub 12, lid 14 and humidity cover 16 may each be plastic molded as single piece components, thereby giving the components increased strength and rigidity. The generally concave shapes and large radii corners may also serve to increase strength and rigidity. Suitable plastics material for the components include polyvinyl chloride, polypropylene and acrylonitrile butadiene styrene (ABS), optionally silane treated as described above.

It will be understood by a person skilled in the art that the depictions of the growing unit 10 are for descriptive purposes only and that many modifications may be made to the growing unit without departing from the spirit or scope of the invention. For example, the relative sizes of the components may be modified depending on the growing unit's capacity requirements. In particular, where a larger growing unit is required, multiple pumps, production manifolds, fans etc may be provided instead of the single elements depicted in the figures.

Figure 13:
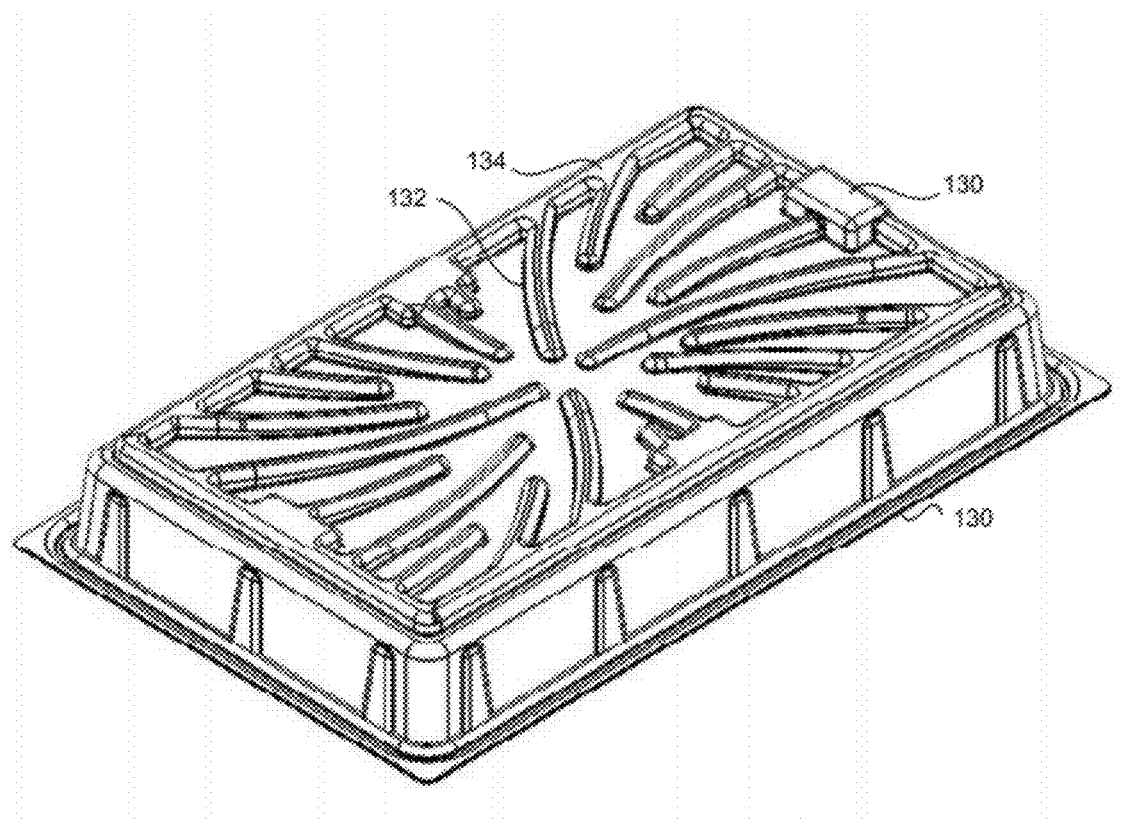
FIG. 13 is substantially a bottom perspective view of a tub of an alternative embodiment.
Figure 14:
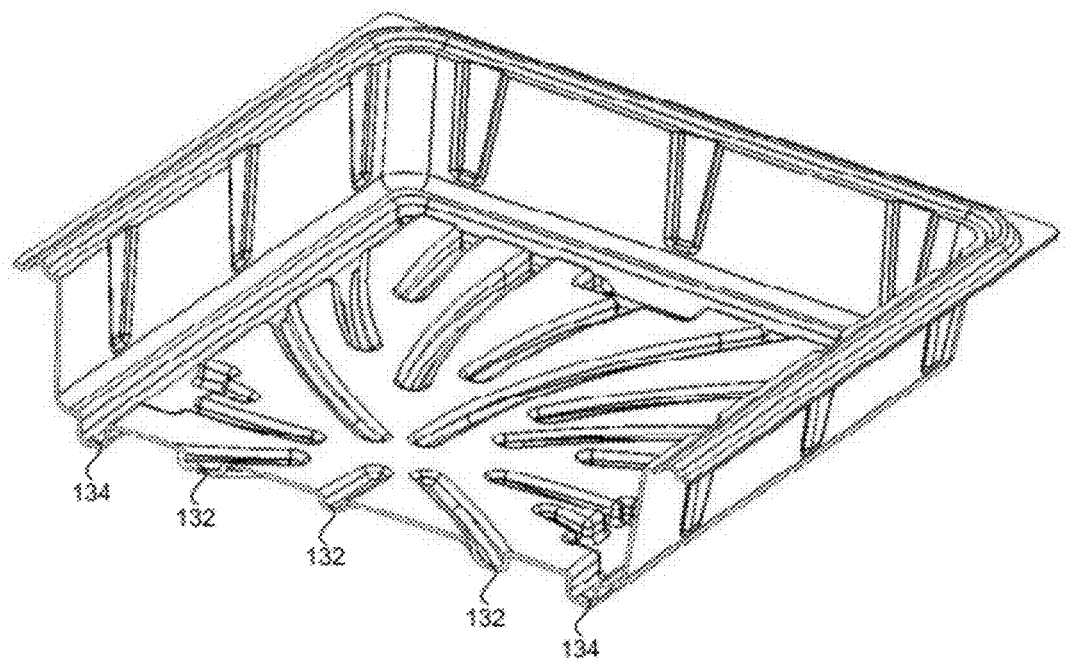
FIG. 14 is substantially a first top perspective cross sectional view of the tub of FIG. 13.
Figure 15:
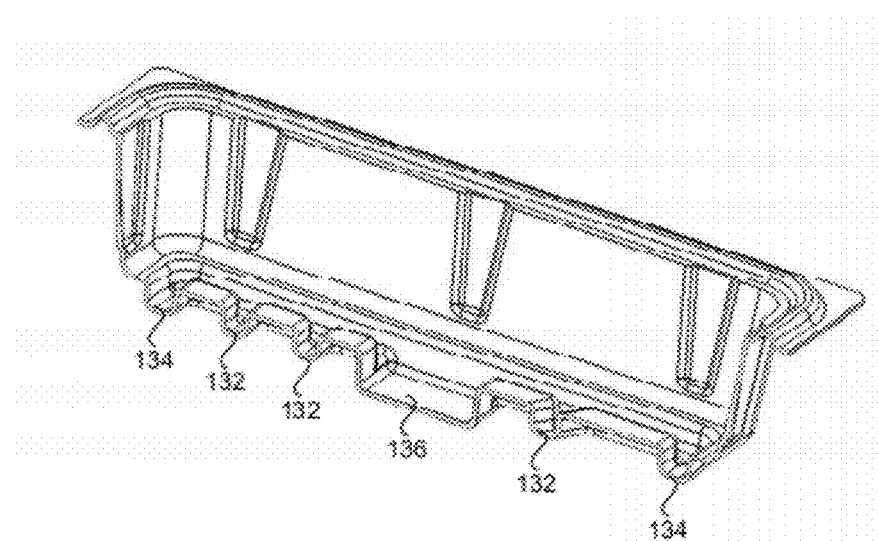
FIG. 15 is substantially a second top perspective cross sectional view of the tub of FIG. 13.
Figure 16:
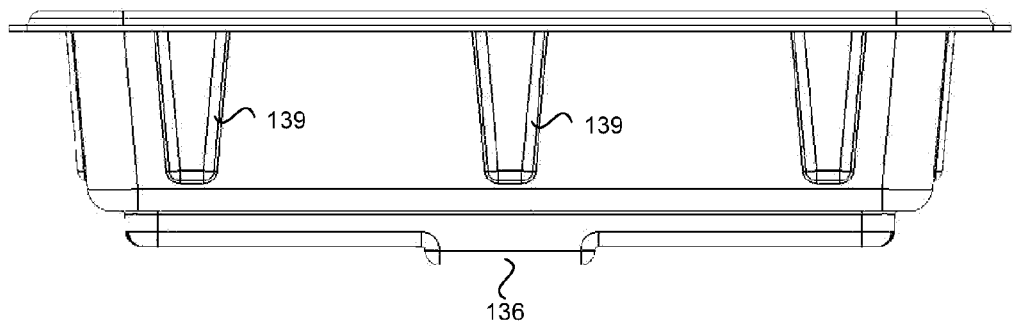
FIG. 16 is substantially an end view of the tub of FIG. 13.
Figure 17:
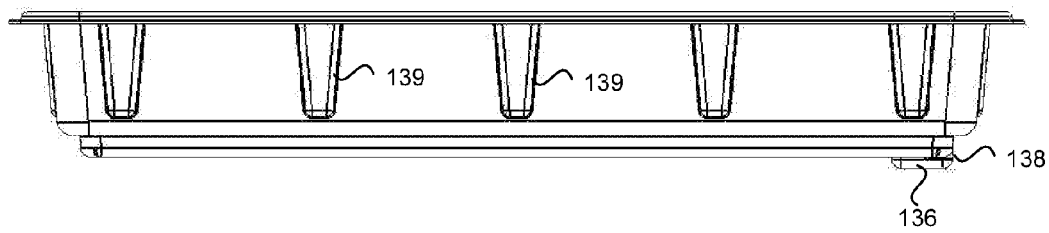
FIG. 17 is substantially a side view of the tub of FIG. 13.

An alternative tub embodiment will now be described with reference to FIGS. 13 to 17. FIG. 13 shows the tub 130 in perspective viewed from the underside. The tub 130 is formed with a plurality of channels 132 that drain generally from the centre to an outer channel 134 around the periphery of the base of the tub 130. The channels 132 and peripheral channel 134 are shown most clearly in the perspective cross section of FIG. 14. The peripheral channel 114 in turn drains to a recess 136 formed in the base at a peripheral edge of the base. The recess 136 defines a low point of tub 110. The recess 136 is shown most clearly in the perspective cross section of FIG. 15 and the respective end and side views of FIGS. 16 and 17. An aperture 138 is formed in the recess 136 that provides an inlet and outlet for a nutrient solution.

The tub may be plastics molded from any suitable plastics material such as polyvinyl chloride, polypropylene and acrylonitrile butadiene styrene (ABS) and may be optionally silane treated as described above. The walls of the tub 130 may be formed with a number of side protrusions 139, such as trapezoidal or similarly shaped protrusions, that increase the strength and rigidity of the tub 110. Though not shown in the earlier embodiments, the growing unit 10 described early may also be provided with such structural elements. Such elements can potentially allow the walls to be made thinner and/or from a cheaper plastic, thereby decreasing costs of the growing unit.

In operation, plants in pots or mesh receptacles may be placed directly on the bottom of the tub 130 or they may be suspended over the bottom using a lid, for example as described previously, rack or similar suspension device. The aperture 138 may be connected via suitable tubing to a fluid nutrient solution source which may comprise a reservoir and pump (not shown). Nutrient solution is flooded into the tub 130 from the nutrient source, thereby irrigating the plants within the tub 130. After a suitable time period, the nutrient solution may be drained from the outlets. The nutrient solution may be returned to the reservoir or to some form of dispensary or collection unit. Diverters may be provided in the connected tubing to divert the returned nutrient solution if required.

The tub 130 is provided with flanges at the upper edges of the side walls that may allow a lid and/or humidity cover to be provided on the tub 130, thereby allowing a controlled growing environment.

The tub 130 may be provided on an elevated surface so that the low point provided by the recess 136 hangs off the surface with the remainder of the tub 130 resting flat on the surface. Alternatively or in addition, one or more supports (not shown) may be provided underneath the tub 130 for maintaining the tub in a level position with the recess 136 forming the low point.

While a single recess 136 is shown in the figures, it will be understood that multiple recesses may be provided in the peripheral edge of the base. The peripheral channel may be shaped to drain towards the multiple recesses. In addition, different peripheral apertures may be used as the inlet for the nutrient solution than for the outlet of the nutrient solution.

Similar to the earlier described embodiments, the tub 130 may be formed with large radii corners, e.g. greater than ¼ inch, which provides for easier cleaning of the tub 130. In addition, the internal walls of the tub 130 may be coated with a silane coating as described above to prevent bacteria and algae from growing on the tub surfaces.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A growing unit comprising:
   (A) a tub comprising at least one wall that defines an interior and an exterior of the tub;
   (B) a fan unit mounted on the exterior of the tub;
   (C) at least one formation on the exterior of the tub for directing air from the fan unit to underneath the tub;
   (D) at least one air inlet in the at least one wall for directing air from the fan unit to the interior of the tub; and
   (E) one or more plant retaining devices receivable in the tub.

2. The growing unit of claim 1 comprising:
   (A) a well formed in a base of the tub;
   (B) a pump received in the well;
   (C) wherein the at least one formation extends to the well.

3. The growing unit of claim 2 wherein the at least one formation comprises a recess in an outer wall of the tub that extends to a recess in an outer surface of a base of the tub.

4. The growing unit of claim 3 wherein the well is formed as a protrusion within the recess in the base.

5. The growing unit of claim 1 wherein the at least one formation directs air from the fan unit to the air inlet.

6. The growing unit of claim 5 comprising a baffle on an inside of the tub that directs air from the air inlet into the tub.

7. The growing unit of claim 1 wherein the tub comprises a plurality of corners and wherein the corners have a radius of greater than ¼ inch.

8. The growing unit of claim 1 wherein the fan unit comprises a shroud that directs air from the fan unit into the at least one formation.

9. The growing unit of claim 1 wherein one or more inner surfaces of the tub comprise a silane or silane derivative coating.

10. The growing unit of claim 1 comprising a lid configured to be received on the tub, wherein the one or more plant retaining devices comprise a plurality of apertures in the lid that are configured to retain a plurality of plant cuttings.

11. The growing unit of claim 10 wherein the lid comprises a plurality of collars within the apertures.

12. The growing unit of claim 11 wherein the apertures comprise a recess outside of the collar configured to facilitate removal of the collars from the apertures.

* * * * *